Inventors
Arvie Glenn Nerheim
James Miskovich
By Ernest A. Johnson
Attorney

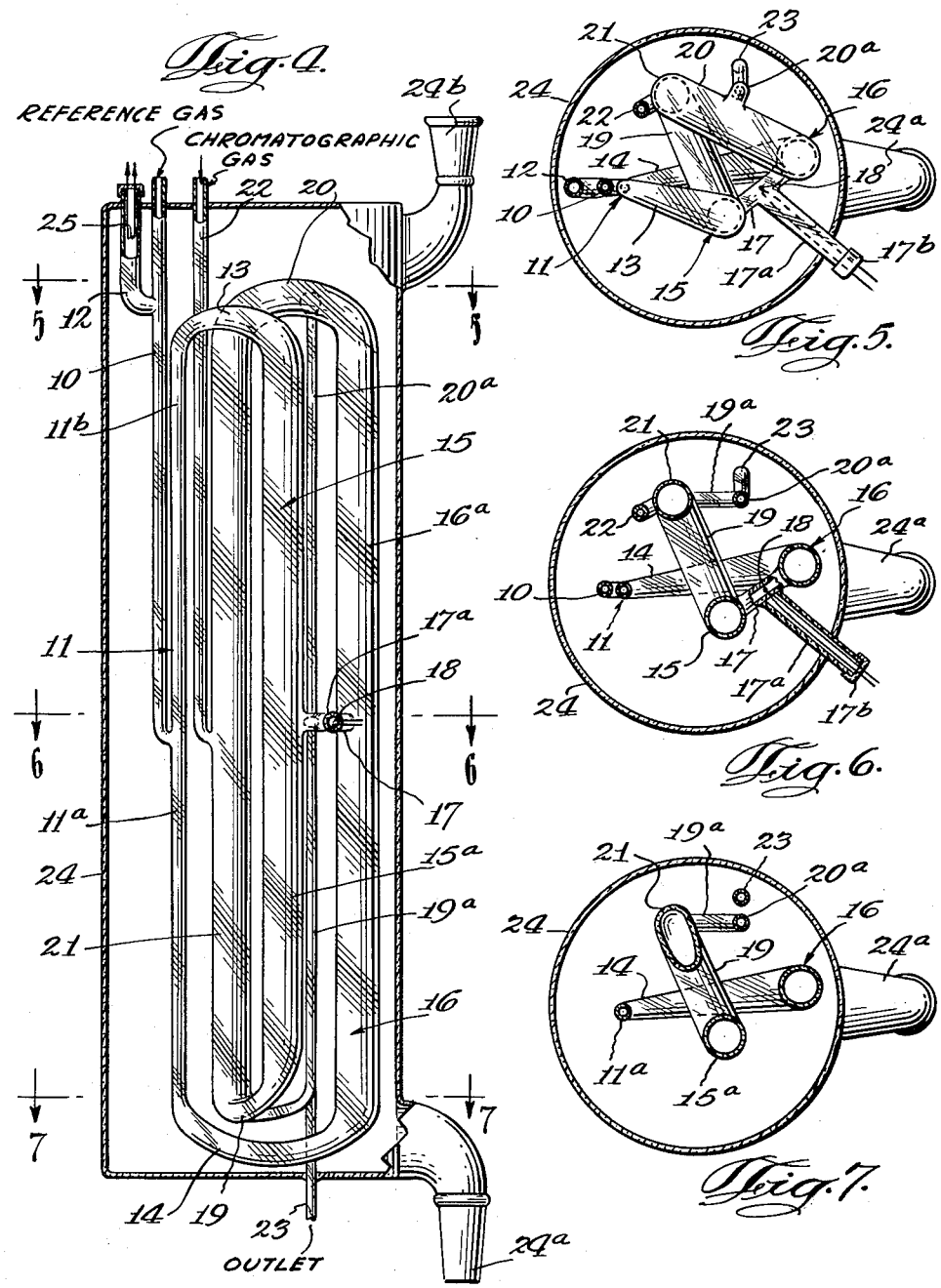

United States Patent Office 3,124,953
Patented Mar. 17, 1964

3,124,953
GAS DENSITY BALANCE
Arvie Glenn Nerheim, Crown Point, and James Miskovich, East Chicago, Ind., assignors to Standard Oil Company, Chicago, Ill., a corporation of Indiana
Filed Jan. 30, 1958, Ser. No. 712,107
1 Claim. (Cl. 73—30)

This invention relates to method and means for the analyses of fluids by means of measuring the density thereof. More particularly, the invention relates to a system for measuring gas and vapor densities as an adjunct to gas chromatography.

Gas chromatography, a new and useful technique for separation and analysis of complex mixtures of volatile materials, is a system wherein components of such mixtures are separated in simple and inexpensive equipment by partition between a stationary phase and a moving gas phase. A few microliters of sample can be analyzed in a relatively short time and the technique is applicable to separation of samples ranging from fixed gases to those that must be distilled at low temperature. Variables that affect separation include column length, flow rate of the eluting gas, temperature, and the chemical nature of the stationary phase.

The separations take place in small columns containing a packing which supports the stationary liquid phase. The liquid, amounting to about 40 weight percent of the solid packing, is distributed as a thin film that provides a large surface for the gas to contact.

Components of a sample are separated as they are carried through the column by the eluting gas, and the components are detected as they pass from the column.

Nitrogen, helium, hydrogen and carbon dioxide are common eluting gases and a flow rate of eluting gas is selected to give an adequate separation in a reasonable length of time, the usual range being 5 to 75 ml. per minute and about 20 ml. per minute or more being preferred. The lower rates are useful for improving difficult separations because of the increased contact time in the column. An analysis usually requires 20 to 60 minutes.

Typically one component of a binary mixture is less soluble in the stationary phase than the other and the less soluble component will remain in the gas phase and be swept through the column at nearly the velocity of the eluting gas. The second component, however, will pass through the column at a lower rate because the process of dissolving in and expelling from the stationary liquid phase takes additional time. Because of differences in partition, the first and second components emerge from the column in the eluting gas at different times and thus are separated.

Several types of detectors have heretofore been proposed and tried for sensing the presence of the component in the eluting gas and it is with respect to such detectors that this invention is directed.

Gas chromatography detectors measure the rapidly changing composition of the effluent gas. Most detectors used in gas chromatography measure parameters only partially dependent on change in density and hence, require calibration. Heretofore a null-flow gas density balance has been proposed which directly measures changes in density. However, such null-flow device requires that means must be provided to cause null flow across a leakage path and is dependent on an electrical null to operate properly. The null-flow device is exceedingly difficult to construct and to maintain. Accordingly, despite the outstanding advantage of a gas density balance in requiring no calibration, other types of detectors, especially thermal conductivity cells with their many disadvantages, have continued in general use. A gas density balance with a linear signal output, fast response, and high sensitivity and with a simplicity of construction approaching that of the thermal conductivity cell, would satisfy the general need for a detector that requires no calibration.

It is, therefore, an important object of this invention to provide an apparatus which has a fast response and is capable of use over a wide range of operating conditions. Another object of the invention is to provide a gas density balance which is particularly suited for use in gas chromatography. A further object of the invention is to provide a method and apparatus for measuring fluid densities wherein the undesirable effects of changes in rate of flow are avoided while being highly responsive to changes in composition. It is also an object of the invention to provide a gas density balance system wherein variations in composition produce an electrical output which is linear. A further object of the invention is to provide a gas density balance which is of simple and inexpensive construction, has no moving parts, and is foolproof in operation.

An important object of the invention is to provide a detector that requires no calibration. An additional object of the invention is to provide a gas density balance which does not require a null flow adjustment. A more specific object of the invention is to provide an apparatus which is not dependent on an electrical null to operate. Still another object of the invention is to provide a gas density balance with a linear signal output, fast response, and high sensitivity while avoiding the difficulties inherent in the prior null-flow gas density balance. These and other objects of the invention will become apparent as the description thereof proceeds.

Briefly, the objects of the invention are attained by providing gas density balance apparatus embodying a reference gas chamber from which the flow of reference gas is divided between two vertically disposed detector tubes having a leakage path duct therebetween. A sample tube extends vertically between upper and lower detector tube outlet conduits which merge to form the apparatus outlet. The detector element of the temperature-sensitive resistance type, which may comprise an incandescent filament such as used in electrical lamps, is mounted within the leakage path duct. The sample stream is introduced into the sample tube intermediate its upper and lower ends and flows both upward and downward toward the respective detector tube outlet conduits. When such sample stream contains a component having a density greater than that of the reference gas, more of the flow tends downward with the result that the reference gas is diverted and the rate of flow through the leakage path duct changes. The heated incandescent lamp filament detects changes in the rate of flow through the leakage path duct caused by changes in gas composition. The changes in flow change the filament resistance which resistance may be compared with a reference filament in an electrical bridge; this measurement is the output of the balance and represents the density of the test sample.

Further details and advantages of the described system will be discussed by reference to the accompanying drawings wherein.

Figure 1:
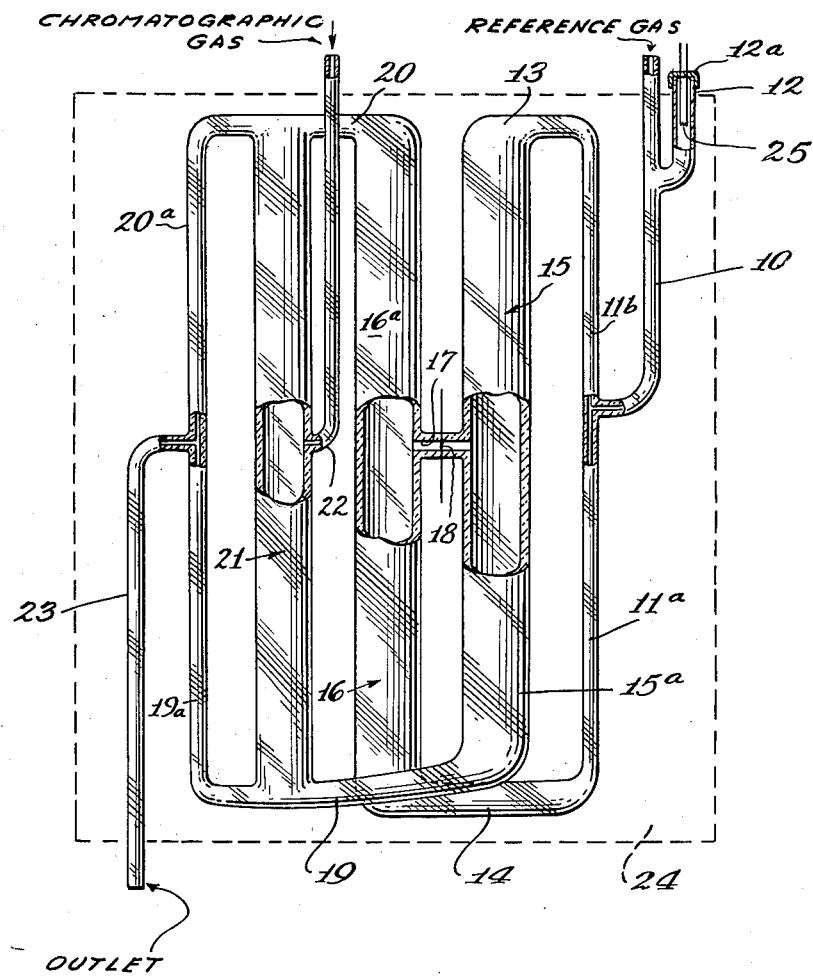
FIGURE 1 is a schematic view of a gas density balance constructed in accordance with the invention.

FIGURE 4 is an elevation of a preferred embodiment of the gas density balance apparatus embodying the principles of FIGURE 1; and FIGURES 5, 6 and 7 are sections taken along the lines 5—5, 6—6 and 7—7, respectively, in FIGURE 4.

Referring to the drawings, the reference gas is introduced by reference gas inlet line 10 into the midpoint of reference gas chamber 11 comprising conduits 11a and 11b. A diffusion chamber 12 in communication with inlet line 10 accommodates a reference filament to be described below. The reference gas flows from either end of the reference chamber 11 via conduits 13 and 14 into the upper and lower ends respectively of the parallel detector tubes 15 and 16 which are joined at their midpoints by the leakage path duct 17. The detector element 18 is mounted within the duct 17 and when it comprises a filament, it is preferably mounted normal to the direction of flow through the duct.

Outlet ducts 19 and 20 lead from the lower end of detector tube 15 and the upper end of detector tube 16 extending laterally therefrom. A sample tube 21 is connected between the two outlet ducts 19 and 20 by its lower and upper ends, respectively, the sample inlet 22 discharging into the sample tube 21 at a selected point intermediate the upper and lower ends of the sample tube. The outlet ducts 19 and 20 merge to form outlet line 23.

The entire unit is housed within a temperature-controlled chamber 24 and supported therein by any suitable means. Suitable temperature control means, including heaters, thermostats, vapor jacket, and the like, can be provided for controlling the temperature of the chamber 24. However, since such temperature control means are well known in the art, details are not given here or in the drawings.

It will be apparent that the reference gas inlet line 10 and outlet line 23 extend through a wall of the chamber 24 and that the sample line 22 projects through a top wall from a gas chromatography column, not shown in FIGURE 1.

When a gas sample, entering sample tube 21, contains a sample component having a density greater than that of the reference gas flowing through the balance, the flow in sample tube 21 tends downward. This decreases flow from the bottom of detector tube 15 and increases flow through the leakage path duct 17 over the detector filament 18. This results in a net change in the temperature and hence in a change of the resistance of the filament 18 which resistance is electrically compared with that of reference filament 25. The output of the bridge circuit is, therefore, an indication of the density of the gas sample introduced into the balance. The reference gas, combined with the sample, flows from outlets 19a and 20a of ducts 19 and 20, emerging from the balance by way of the outlet line 23 which is flow-restrictive.

Figure 2:
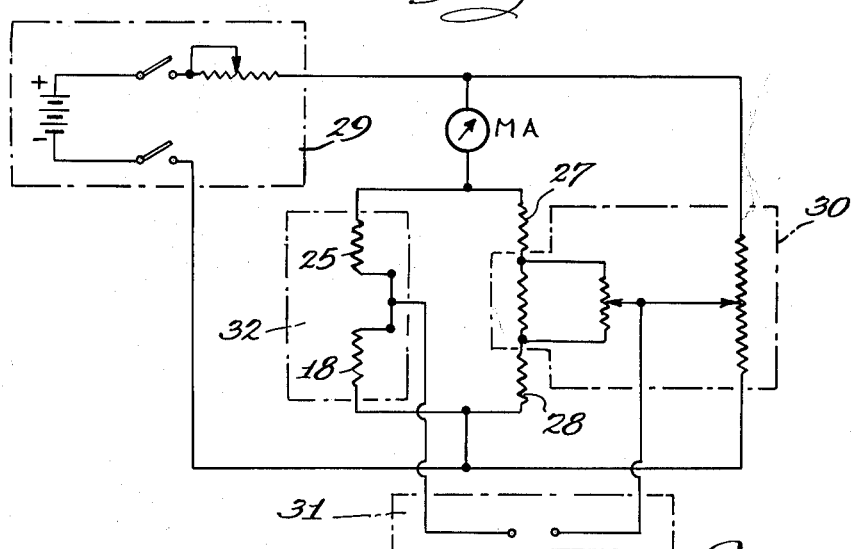
FIGURE 2 is a diagrammatic showing of an electrical bridge circuit including the detector components of the apparatus in FIGURE 1.

Referring to the bridge circuit of FIGURE 2, it is a Wheatstone bridge comprising standard resistances 27 and 28, the heated flow detector filament 18, and the heated reference filament 25 comprising hot wire resistance elements. A constant voltage supply 29, a zero adjusting means 20, and an output voltage-responsive means such as recorder 31. This general type of bridge circuit and its operation are well known and will not be described in further detail.

The detector element 18 and reference element 25 are preferably filaments comprising precise lengths of tungsten wire but it is also contemplated that they may be replaced by thermistors, i.e. an element having negative resistance characteristics in which an increase in temperature of the resistance element decreases resistance.

The electrical leads to the detector elements 18 and 25 may enter the balance 32 through suitable gas-tight seals. As shown in FIGURES 4, 5 and 6, the leads to the detector 18 may be conducted through the vapor jacket 24 via tube 17a, the outer exposed end thereof being enclosed by a removable cap 17b. In FIGURES 1 and 4, we have illustrated the reference filament 25 within the thermostated arm 12 having a removable closure comprising serum cap 12a. More permanent seals may be made if desired by fusing the lead wires to detectors 18 and 25 directly into the wall of the balance and this is quite practicable since our detector elements 18 and 25 may be used many months without replacement.

Reverting to FIGURE 1, our dynamic gas density balance functions in the following manner. When chromatographic gas entering 21 from inlet 22 and flowing both upward and downward in sample tube 21 becomes more dense than the reference gas supplied by 10, pressure increases in 19, slowing reference gas flow through conduit 15a and outlet duct 19. As a result, reference gas flow increases through conduit 16a and outlet duct 20. This increase in reference gas flow through 16a and 20, and a corresponding decrease in reference gas flow through 15a and 19, are attained by the pressure difference across leakage path duct 17 causing reference gas to flow from conduit 15 to conduit 16a via this duct 17. Flow through the leakage path duct 17, as sensed by detector element 18, is a measure of the change in density of the chromatographic gas.

A balance according to our invention having the following dimensions and illustrated in FIGURES 4 to 7, was constructed and tested:

| Conduit | Length, cm. | Diameter, cm. |
| --- | --- | --- |
| 11 | 12 | 0.46 |
| 15 | 12 | 0.86 |
| 15a | 6 | 0.86 |
| 16 | 12 | 0.86 |
| 16a | 6 | 0.86 |
| 17 | 1.95 | 0.41 |
| 19 | 9 | 0.46 |
| 20 | 6 | 0.46 |
| 21 | 12 | 0.86 |

Figure 3:
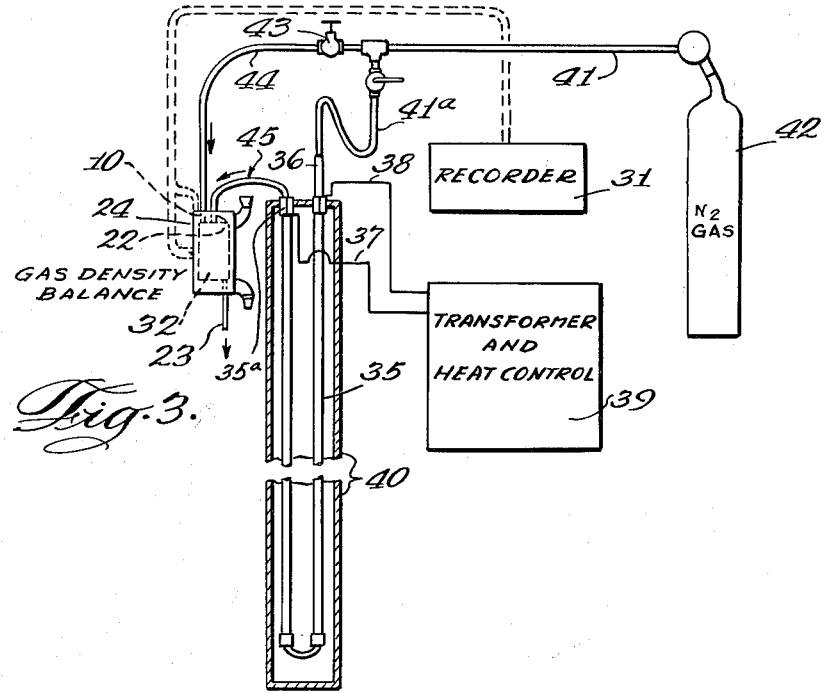
FIGURE 3 is an elevation partly in section and diagram of a gas chromatographic analysis installation embodying the detector of this invention.

The described balance has been used successfully as a detector for a macro-gas chromatography installation as illustrated in FIGURE 3, the balance 32 being vapor jacketed and operated at 125° C. The sample is injected into the column 35 through a pipet 36, the column 35 comprising 16 feet of ½ inch pipe containing a suitable column packing, such as about 40 weight percent silicone oil on 30–60 mesh fire brick.

The column 35 is directly heated with low voltage current carried by leads 37 and 38 from the transformer 39 and is enclosed by insulation 40. The column 35 may be operated from room temperature up to 150° C., the upper temperature being limited only by the boiling point of the stationary phase in the column 35.

The eluting gas, such as nitrogen, is supplied by line 41 from cylinder 42 to the column 35 via valved sample line 41a and sample pipet 36. A portion of the eluting gas flows directly via flow control valve 43 and line 44 as reference gas to inlet 10 in the vapor jacketed gas density balance 32.

The column effluent gas is detected in our gas density balance 32 which is connected by line 45 to the outlet end 35a of the column 35. The change in output of the balance detector circuit of FIGURE 2 is measured and recorded on recorder 31 directly without amplification.

When a component is eluted from the column 35 into the balance 32, it is recorded as a chromatographic peak. The area of the peak is a linear function of the amount of component.

Several known blends of hydrocarbons of sample sizes from 0.15 to 1 ml. were run on the macro-gas chromatography setup at 720 ml./min. chromatographic gas flow and 720 ml./min. reference gas flow. The peak area produced by a component was corrected for molecular weight. Then the weight percent of a component was plotted as a function of peak area percent of that component. These results illustrate that the balance, constructed in accordance with our invention, is an effective detector for macro-gas chromatography, requiring no calibration.

Our gas density balance is also an effective detector for micro-gas chromatography, ordinarily requiring low flow rates of the order of 100 ml./min. A comparison of the electrical output of our balance with that of the prior art null-flow variety was made at room temperature and at a flow rate of 100 ml./min., 0.5 ml. of butane being charged to each. The usable electrical output of our balance was more than twice that of the null-flow device which was not usable without amplification, and to obtain a comparable signal from the null-flow device, it must be amplified at least two times.

The balance described and illustrated in the drawings is designed to handle large samples (0.2 to 5 ml.) at high flow rates (400 to 1000 ml./min.) but dimensions can be selected to handle small samples at low flow rates. It will be understood that reference gas flow rates may require some readjustment to accommodate balances of different dimensions, as described in connection with the macro-gas and micro-gas chromatography detectors herein. For example, the output of our balance can be increased by causing more flow across the detector filament 18 within leakage path duct 17 by decreasing the diameter of one portion 11$a$ of the reference gas chamber 11 as compared to portion 11$b$ thereby to cause more flow through 11$b$ and hence to 17. Alternatively, as shown in FIGURE 1, increased flow through duct 17 may be achieved by making conduit 11$a$ longer than conduit 11$b$. In addition, this enables us to get more nearly linear output from the balance.

The balance can be adapted further for work on micro samples by increasing the sensitivity. This can be done by increasing the velocity through duct 17 by making it shorter and of smaller diameter. Because the output of the detector filament 18 is larger for a given velocity change at high velocity, an increase in the sensitivity results. In addition, this will cause a larger portion of the potential head (driving force) to be expended over the filament which results in more output for a given potential head.

Another advantage obtained by narrowing the diameter of duct 17 is that it allows the balance to be operated at a lower total flow which is necessary for micro-gas chromatographic work. Lower flows are permitted because decreasing the diameter of 17 causes more friction at a given change in flow rate to balance the potential head caused by the introduced sample. In this connection, it will be apparent that potential head must be balanced by frictional head in order for the balance to operate properly.

Typical dimensions for a balance adapted for micro work are:

| Component in Fig. 1 | Height or Length, cm. | Diameter, cm. |
|---|---|---|
| 11$a$, 11$b$ } 11 | 4, 4 | 0.1, 0.07 |
| 15 | 4 | 1.0 |
| 15$a$ | 4 | 1.0 |
| 16 | 4 | 1.0 |
| 16$a$ | 4 | 1.0 |
| 17 | 1 | 0.30 |
| 19 | 1.5 | 0.8 |
| 19$a$ | 4 | 0.1 |
| 20 | 1.5 | 0.8 |
| 20$a$ | 4 | 0.1 |
| 21 | 8 | 0.8 |

Although the invention has been described with reference to preferred embodiments and modifications thereof, it is to be understood that these are by way of illustration only. Accordingly, it is contemplated that modifications and variations can be made in the apparatus by those skilled in the art in light of the preceding description without departing from the spirit and scope of the invention.

What we claim is:

In a system for testing gas mixtures with respect to the density thereof, the improvement characterized by elimination of movable parts heretofore required to establish null leakage when sample gas and reference gas have identical densities, comprising in combination a clear reference gas manifold, a pair of reference gas detector tubes communicating with said manifold, a leakage path duct between said tubes, a pair of clear outlet ducts each communicating with a discharge end of said reference gas detector tubes, a capillary outlet means into which said outlet ducts discharge, a substantially vertical sample tube communicating at its opposite ends with said outlet ducts, a sample inlet conduit for introducing the gas mixtures into said sample tube intermediate the ends thereof, and a temperature-sensitive electrical resistance element in said leakage path duct responsive to changes in rate of flow therethrough.

References Cited in the file of this patent

UNITED STATES PATENTS 2,136,991    De Blois _____ Nov. 15, 1938
2,728,219    Martin _____ Dec. 27, 1955

OTHER REFERENCES

"Properties of Martin Gas Density Balance and Possible Modifications Thereof," by Munday and Primavesi in book—Vapor Phase Chromatography, by Desty, pages 147–163, published by Butterworths Scientific Publishers, London, 1957.